UNITED STATES PATENT OFFICE.

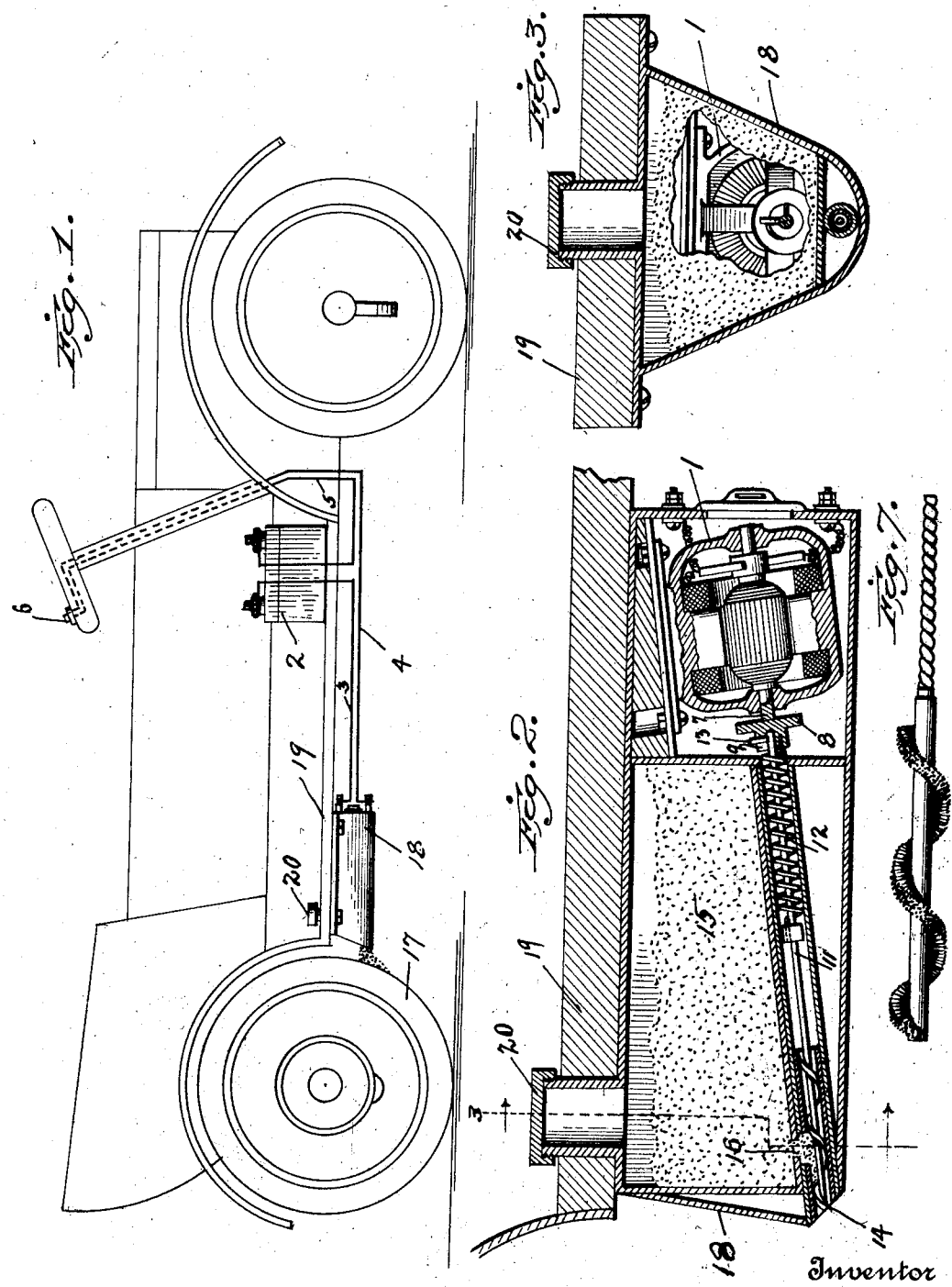

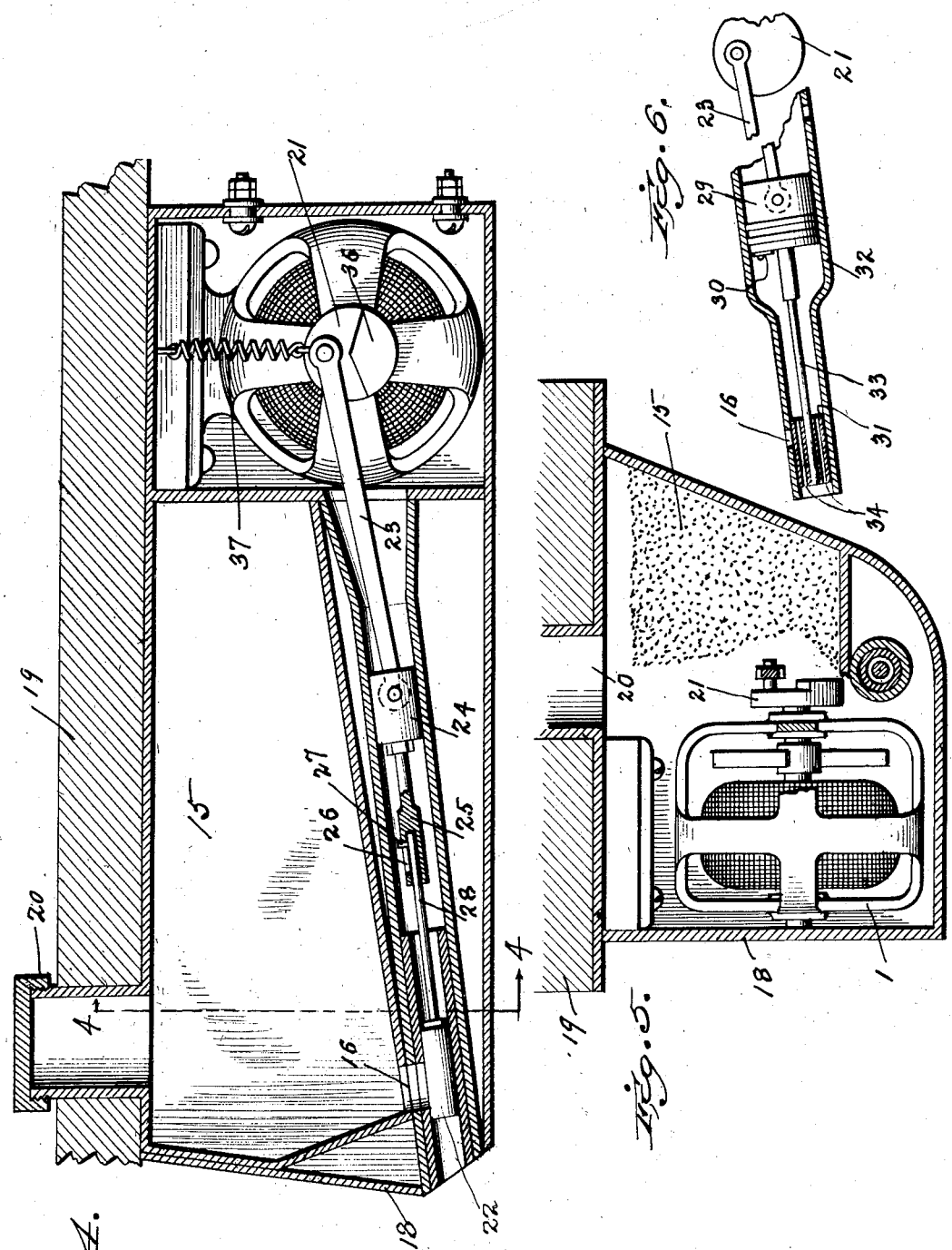

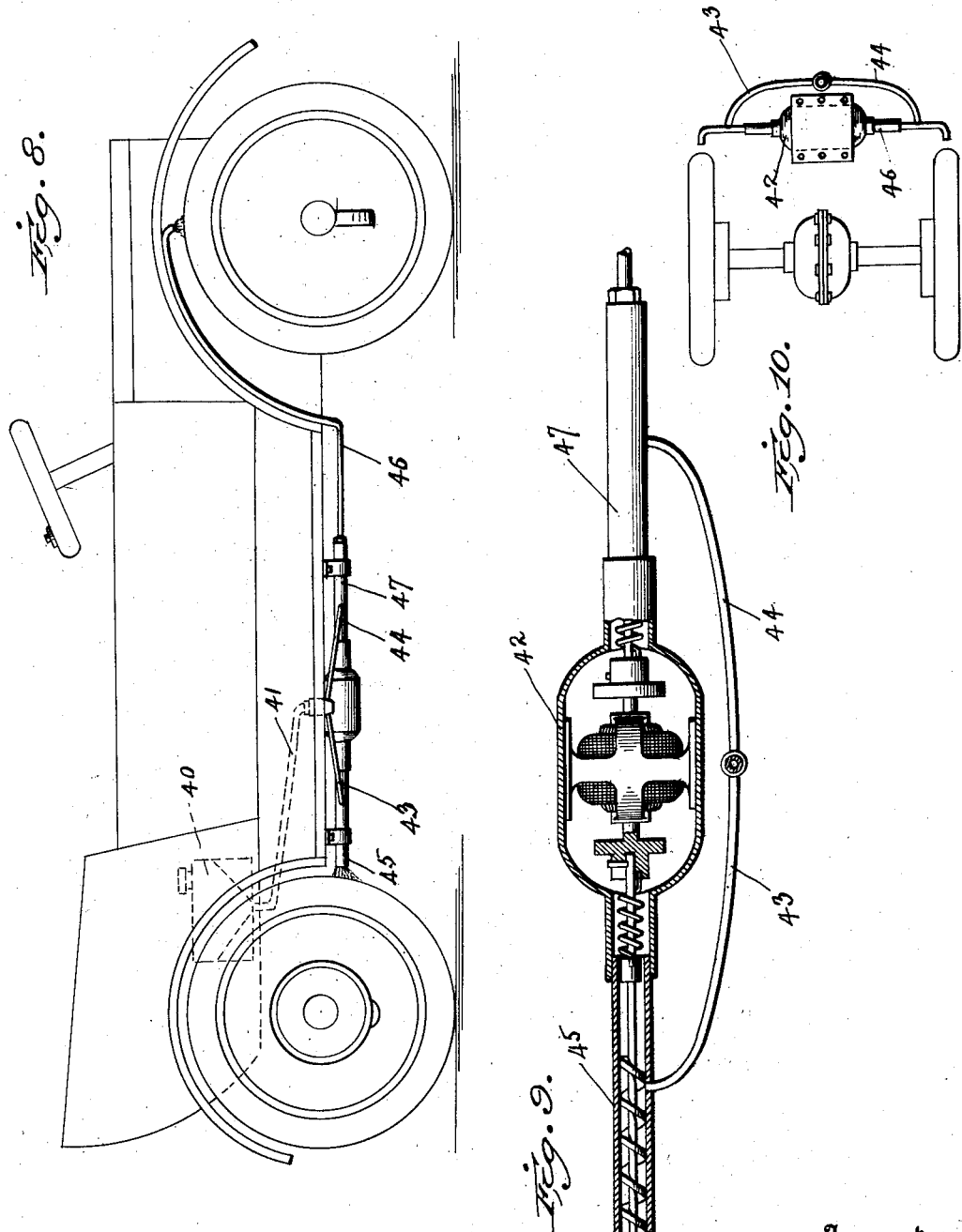

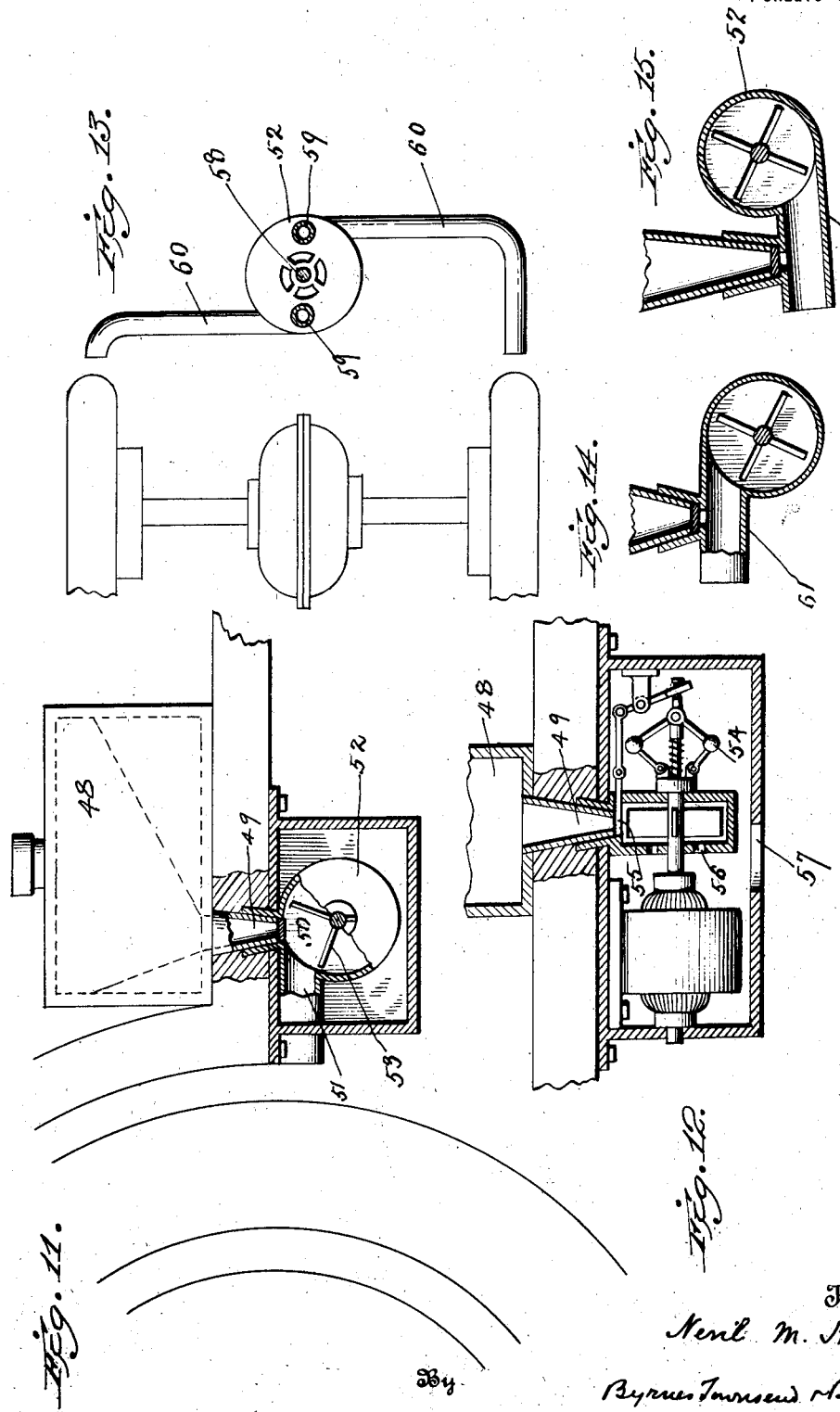

NEVIL MONROE HOPKINS, OF WASHINGTON, DISTRICT OF COLUMBIA.

ANTISKID DEVICE FOR MOTOR-PROPELLED VEHICLES.

1,328,739.  Specification of Letters Patent.  Patented Jan. 20, 1920.

Application filed September 25, 1919. Serial No. 326,199.

*To all whom it may concern:*

Be it known that I, NEVIL MONROE HOPKINS, a citizen of the United States, residing at Washington, in the District of Columbia, have invented certain new and useful Improvements in Antiskid Devices for Motor-propelled Vehicles, of which the following is a specification.

My invention relates to an improvement in anti-skid devices for motor-propelled vehicles, and more particularly to a device of this type operated by independent electro-magnetic means, and designed to forcibly project an abrasive or desiccating material against a tire of the vehicle wheel.

Anti-skid devices heretofore used have commonly depended for their operation upon the action of the force of gravity, upon the use of a gas under pressure such as compressed air or the motor exhaust gases, or upon the rotation of a screw conveyer controlled through the driving mechanism of the vehicle. The operation of these devices has usually depended in some way upon the motion of the vehicle, and they have therefore suffered the disadvantage that they could not be relied upon when the vehicle was not under complete control of the driver.

It is the particular purpose of my invention to provide an anti-skid device, the operation of which is entirely independent of the motion of the vehicle and which is therefore under complete control of the driver at all times. This object I attain by the use of an electric motor adapted to operate on a low voltage storage battery and having its shaft connected to a screw conveyer, a reciprocative piston, an air pump a fan or equivalent material projecting mechanism.

My invention may be best understood by reference to the accompanying drawings, in which:—

Figure 1 is a side elevation showing the manner in which my improved device may be attached to the running board of an automobile;

Fig. 2 is a longitudinal section showing various details of the device;

Fig. 3 is a transverse section taken on the line 3—3 of Fig. 2, a part of the view being broken away to show certain details of the device;

Fig. 4 is a modified embodiment of my invention shown in longitudinal section;

Fig. 5 is a transverse section taken on the line 4—4 of Fig. 4, a part being broken away to show certain details;

Fig. 6 is a broken sectional view of a still further embodiment of the invention.

Fig. 7 is a modified form of screw conveyer in which the contact edges consist of a wire brush or similar flexible contact means;

Fig. 8 is a side elevation showing the manner in which the invention may be used to apply abrasive or desiccating material to the front and rear wheels of an automobile;

Fig. 9 is a plan view showing partly in section the anti-skid device illustrated in Fig. 8;

Fig. 10 is a modification of the device adopted to apply abrasive or desiccating material to either the two front or rear wheels of a vehicle; and Figs. 11, 12, 13, 14 and 15 show the use of a fan for the purpose of projecting the abrasive or desiccating material onto the tire of a vehicle wheel.

The operation of my device may be understood by reference to Figs. 1, 2 and 3 in which an electric motor 1 is illustrated as connectible to the storage battery 2 through conductors 3, 4 and 5, and the push button 6. In this particular embodiment of the invention, the motor shaft 7 has fixed to one of its ends a collar 8 provided with a notch extending in a circumferential direction between the surfaces 9 and 10. This collar is flexibly connected to the conveyer shaft 11 through the spiral spring 12 by means of which a pin 13 fixed to the end of the conveyer shaft 11 is held against the surface 9 when the motor is at rest. The collar 8 and the spring 12 constitute, in fact, a flexible coupling between the motor 1 and conveyer 14.

When the motor starts to rotate it turns in direction adapted to bring the surface ten of the notch forcibly into contact with the pin 13 and thus to deliver a blow to this pin so that the static friction of the conveyer 14 is suddenly transformed into kinetic friction, and excessive starting load upon the motor is avoided.

The abrasive or desiccating material flows from the supply tank 15 through the opening 16 into the casing of the conveyer which casing I may term the charging chamber due to the force of gravity, and is held there until the motor 1 is started by pressing the push button 6 when it is forcibly projected against the tire 17.

The complete device may be inclosed in a casing 18 and attached to the running board 19, an opening 20 being provided for replenishing the supply of abrasive or desiccating material as may be found necessary.

The embodiment of the invention illustrated in Fig. 4 differs from that just described in that the motor 1 is provided with a crank disk 21 connected to a reciprocative piston 22 through the connecting rod 23, the guide 24, and the loose coupling 25. This coupling has in one of its sides a slot 26 adapted to coöperate with a pin 27 on the end of the piston rod 28. As the crank disk 21 revolves the guide 24 travels to and fro in its casing and due to the slot-pin arrangement of the loose coupling 25 the piston is always set in motion by a blow which suddenly transforms the static friction of the plunger 22 into kinetic friction and, as in the case previously described, an excessively high starting load upon the motor is avoided.

As the piston 22 travels to and from, the abrasive or desiccating material is fed into the piston casing from the tank 15 through orifice 16 and by the piston movement is forcibly projected against the tire of the wheel (not shown). A counter-weight 36 or a spring 37 may be provided for always bringing the piston to rest in such position as to prevent loss of material when the projecting mechanism is not in operation.

In the modification of the device shown in Fig. 6, the crank disk 21 is illustrated as connected through the rod 23 to the plunger 29 of an air pump 32. The reciprocative nozzle 31 of the air pump is rigidly connected to the plunger 29 through the rod 33, and as it travels to and fro in its casing permits the material to flow from a tank (not shown) through the orifice 16 into the nozzle casing from whence it is forcibly projected by the air which is forced through the openings 34 as the plunger 29 reciprocates in its casing. A suitable valve 30 is provided for admitting air into the space 35 as the plunger 29 makes its return stroke.

In the type of device illustrated in Figs. 8 and 9, an abrasive or desiccating material is fed by gravity from the tank 40 through pipes 41, 43 and 44 into the casings of conveyers 45 and 47, whence it is projected onto the rear wheel of a vehicle by conveyer 45 and by conveyer 47 is forced through pipe 46 and spread upon the surface of the front wheel tire. Conveyers 45 and 47 are operated by a single motor 1 inclosed within a suitable casing 42.

In Fig. 10 the abrasive or desiccating material is fed from a tank (not shown) through pipes 43 and 44 into the casings of screw conveyers 45 and 46 from whence it is projected upon the tires of two wheels attached to the same axles, a single motor being provided for operating the two conveyers.

In Figs. 11 and 12 is illustrated a modification of the invention in which abrasive or desiccating material is fed from the tank 48 through the opening 49 into a fan chamber 50, from whence it is projected through the pipe 51 upon the tire of a vehicle wheel. In this case, projection of the material is brought about partially through the current of air created by the fan 52, and partially by the impetus received due to actual contact with the fan blades 53. The fan 52 is operated by an electric motor 1 and has attached to its shaft a fly-ball mechanism 54 adapted to open the gate 55 to supply material to the fan from the tank 48 when the motor has reached a suitable speed. Openings 56 and 57 are provided for supplying air to the fan.

In the type of device shown in Fig. 13 the fan 52 is rotated through a vertical shaft 58, abrasive or desiccating material being fed to the fan through the openings 59 and pipes 60 being provided for directing the material to the tires of the wheels.

In Figs. 14 and 15 are illustrated fragmentary views of simple devices for feeding the abrasive or desiccating material into the discharge pipe 60 in advance of the fan 52 so that the material in this instance does not come into contact with the fan blades and therefore depends for its motion entirely upon the action of the air current created by the fan.

The operation of my device will be readily understood from the foregoing description.

As the abrasive or desiccating material to be applied to the tire, I may use finely divided solid material, such as sand, ashes, sawdust, Portland cement, or a mixture of such substances.

In order to have any of these materials effective upon vehicles free to slide sidewise or skid on a slippery pavement, it is essential that anti-skid material be directed against the revolving tire and be fed to the surface of this revolving tire before or during the time that skidding occurs. Since skidding usually takes place in wet weather, the revolving tires are wet and the moisture causes the stream of finely divided gritty material to adhere to the tire and thus prevent or largely diminish skidding, since the gritty material is located on the tire and thus exerts an anti-skid effect upon contact of the tire and the wet pavement. Heretofore sand has been applied to the pavement in the vicinity of the revolving tires, but it is obvious that the skidding car is not arrested or benefitted by the sand or other material upon the ground because of the lateral slide or skid out of the path of the ground strewn with sand.

My invention is equally as applicable to electrically driven vehicles as to vehicles driven by a prime mover such as a steam or internal combustion engine.

While I have chosen to illustrate my invention as applied through different types of projector mechanisms, each adapted to spread an abrasive or desiccating material upon the tire of a wheel, I do not intend to limit myself to these specific devices as it is obvious that certain substitutions may be made without in anywise departing from the spirit of my invention.

I claim:

1. An anti-skid device comprising a charging chamber for receiving abrasive material, mechanism for forcibly ejecting said material, motor means for actuating said mechanism and a box-like casing for inclosing said parts in assembled relation as a single compact structural unit.

2. In an anti-skid device for vehicles, the combination of a charging chamber for receiving abrasive or desiccating material, mechanism for projecting the material and means for actuating said mechanism, said mechanism and actuating means being so constructed and related that the actuating means is started under no-load condition.

3. In an anti-skid device for vehicles the combination of a charging chamber for receiving abrasive or desiccating material, mechanism for projecting the material, electrical means for actuating the projecting mechanism and means operative to start the said actuating device under no-load condition.

4. In an anti-skid device for vehicles, the combination of a charging chamber for receiving abrasive or desiccating material, means for feeding material thereto and means including a motor for projecting the material, said latter means including mechanism responsive to the action of the motor for controlling the feeding means.

5. In an anti-skid device for motor-propelled vehicles, the combination of a receptacle adapted to contain abrasive or desiccating material, an electric motor, a screw conveyer operated by said motor, and a lost motion coupling connected at one of its ends to said motor and at its other end to said conveyer.

6. In an anti-skid device for motor-propelled vehicles, the combination of a receptacle adapted to contain abrasive or desiccating material, an electric motor, a screw conveyer operated by said motor, a hollow collar upon one end of the shaft of said motor, a notch in one side of said collar, a conveyer shaft extending into said collar, a pin upon the end of said conveyer shaft extending into said notch and a helical spring fixed at one end to said conveyer shaft and at the other end to said collar.

7. The method of starting an anti-skid device for motor-propelled vehicles which consists in suddenly transforming the static friction of a projector mechanism into kinetic friction by means of a blow struck in a direction adapted to set said mechanism in motion.

8. The method of starting an anti-skid device for motor-propelled vehicles which consists in suddenly transforming the static friction of a projector mechanism into kinetic friction by means of a blow struck in a direction adapted to rotate said mechanism.

9. The method of operating an anti-skid device for motor propelled vehicles which consists in suddenly transforming the static friction of a projector mechanism into kinetic friction by means of blows struck in directions adapted to reciprocate said mechanism.

In testimony whereof, I affix my signature.

NEVIL MONROE HOPKINS.